United States Patent [19]

Carlin

[11] Patent Number: 5,673,292
[45] Date of Patent: Sep. 30, 1997

[54] AM-PSK SYSTEM FOR BROADCASTING A COMPOSITE ANALOG AND DIGITAL SIGNAL USING ADAPTIVE M-ARY PSK MODULATION

[75] Inventor: Barry W. Carlin, Greenhills, Ohio

[73] Assignee: Northrop Grumman Corporation, Los Angeles, Calif.

[21] Appl. No.: 718,253

[22] Filed: Sep. 20, 1996

Related U.S. Application Data

[63] Continuation of Ser. No. 319,687, Oct. 7, 1994, abandoned.
[51] Int. Cl.⁶ .................. H04L 27/34; H04L 27/36; H04L 27/38
[52] U.S. Cl. .......... 375/269; 375/300; 375/332; 375/340; 370/297; 329/348; 332/151; 455/102
[58] Field of Search .................... 375/280, 279, 375/271, 269, 260, 308, 302, 300, 216, 320, 322, 324, 329, 332, 340; 332/149, 151, 145, 108, 106, 115, 103; 329/304, 347, 348, 350; 370/297, 345, 529; 455/102, 108; 381/2, 15

[56] References Cited

U.S. PATENT DOCUMENTS

| | | | |
|---|---|---|---|
| 4,029,903 | 6/1977 | Tamburelli | 375/269 |
| 4,084,137 | 4/1978 | Welti | 375/260 |
| 4,170,764 | 10/1979 | Salz et al. | 375/269 |
| 4,247,944 | 1/1981 | Sifford | 375/340 |
| 4,464,767 | 8/1984 | Bremer | 375/298 |
| 4,675,619 | 6/1987 | Uchibori et al. | 332/151 |
| 4,688,255 | 8/1987 | Kahn | 381/16 |
| 4,751,478 | 6/1988 | Yoshida | 332/104 |
| 5,084,903 | 1/1992 | McNamara et al. | 375/269 |
| 5,283,780 | 2/1994 | Schuchman et al. | 370/50 |
| 5,333,155 | 7/1994 | Dambacher | 375/240 |

*Primary Examiner*—Wellington Chin
*Assistant Examiner*—William Luther
*Attorney, Agent, or Firm*—Walter G. Sutcliff

[57] ABSTRACT

A radio-frequency broadcasting system and method for simultaneously broadcasting analog and digital signals in a standard AM broadcasting channel wherein the system includes: a transmitter for providing, and broadcasting, a composite signal containing an adaptively-modulated phase-shift-keyed digital signal with analog programming material modulated thereon; and a receiver for detecting the composite signal, extracting the analog audio signal and digital audio, or data, therefrom, and playing back the received audio programming. The adaptively-modulated phase-shift-keyed digital signal is responsive to the transmitted signal, dynamically increasing the digital data transmission rate as the transmitted signal power increases. Symbol states are generally arranged around concentric arcs, and adjacent symbol states are generally equidistant.

30 Claims, 5 Drawing Sheets

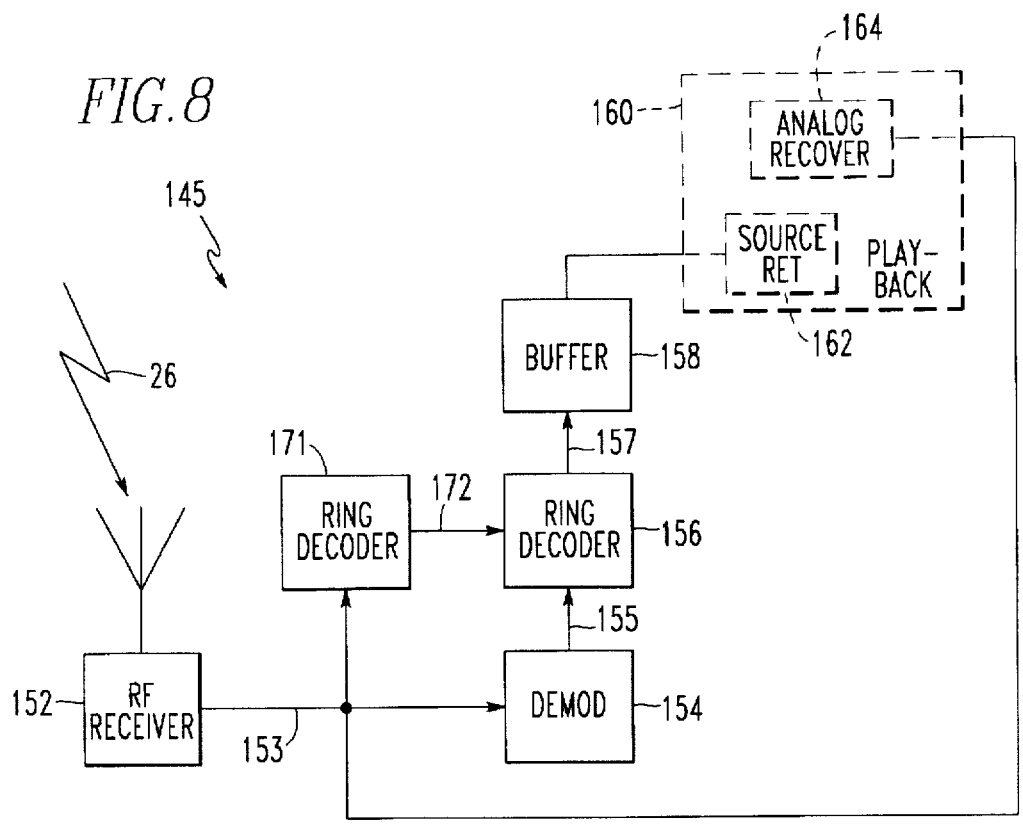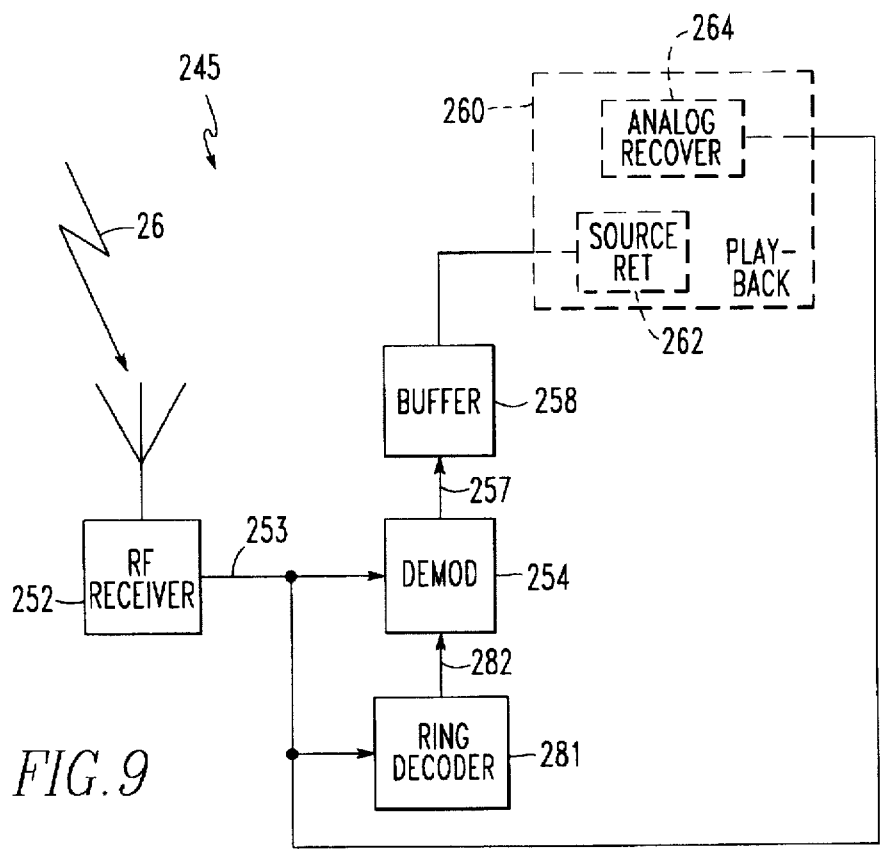

AM-PSK SYSTEM FOR BROADCASTING A COMPOSITE ANALOG AND DIGITAL SIGNAL USING ADAPTIVE M-ARY PSK MODULATION

This application is a continuation of application Ser. No. 08/319,687 filed on Oct. 7, 1994, now abandoned.

BACKGROUND OF THE INVENTION

1. Field of the Invention

This invention relates to radio broadcasting and, more particularly, to an apparatus for, and method of, broadcasting analog amplitude-modulated and adaptively-modulated digital signals simultaneously within the same frequency channel assignment.

2. Description of the Related Art

There has been increasing interest in the possibility of broadcasting a digitally encoded audio signal in tandem with its analog counterpart to provide improved audio fidelity. Several approaches have been suggested. One such approach, set forth in co-pending patent application Ser. No. 08/206,368, filed Mar. 7, 1994, assigned to the assignee hereof, presents a method for simultaneously broadcasting analog and digital signals in a standard AM broadcasting channel. Using this approach, an amplitude-modulated radio frequency signal having a first frequency spectrum is broadcast. The amplitude-modulated radio frequency signal includes a first carrier modulated by an analog program signal. Simultaneously, a plurality of digitally-modulated carrier Signals are broadcast within a bandwidth which encompasses the first frequency spectrum. Each digitally-modulated carrier signal is modulated by a portion of a digital program signal. A first group of the digitally-modulated carrier signals lies within the first frequency spectrum and is modulated in quadrature with the first carrier signal. Second and third groups of the digitally-modulated carrier signals lie outside of the first frequency spectrum and are modulated both in-phase and in-quadrature with the first carrier signal. Both transmitters and receivers are provided in accordance with that method.

The waveform in the AM-compatible digital audio broadcasting system described in Ser. No. 08/206,368, filed Mar. 7, 1994, hereby incorporated herein by reference, has been formulated to provide optimal capacity to the digital signal while avoiding cross-talk into the analog AM channel. Multiple carriers are employed by means of orthogonal frequency division multiplexing (OFDM) to bear the communicated information.

One way in which data can be encoded for transmission is to designate an array of data points in a complex plane and then assign each of these points to represent a particular pattern of digital information, or symbol. These data points can be described by either real and imaginary, or phase and amplitude, numbers. Each such array of data points is called a constellation. Using this encoding scheme, a received signal can be related to specific symbols in the constellation, and identified with the original information transmitted.

Phase-shift-keying (PSK) is such an encoding scheme, in which the modulating function shifts the instantaneous phase of the carrier among predetermined discrete symbols. The information, therefore, can reside in the phase of the carrier. From the perspective of noise immunity, coherent PSK can be superior to other schemes. Modulated signals can carry information in the symbol's amplitude as well as its phase, further increasing the information carried by any particular symbol. However, in practice, the number of symbols able to be clustered into a particular constellation is limited by factors such as symbol rate and channel distortion.

Optimum multi-level signal detection theory requires that the constellation signal "closest" to the received signal be selected as the most likely signal transmitted. "Closest" in the complex plane is defined as the constellation point in the set with the minimum distance to the received signal. If the constellation is defined on a rectangular grid in the complex plane, then the minimum distance can be determined by simple and independent tests of the magnitude of the real and imaginary components of the received signal. If the constellation is arranged in a circular fashion, then the decision regions associated with each symbol are normally defined in terms of polar coordinates rather than quadrature component definitions.

Factors such as thermal noise, intersymbol interference, random and non-linear channel effects, and the like, (collectively, "distortion") can corrupt both the phase and the amplitude of the transmitted signal waveform, thereby tending to reduce the separation between neighboring symbols. In general, the information, $I_M$, transmitted by a M-ary symbol is:

$$I_M = \log_2 M \text{ binary digits, or bits}$$

Although the information transmission rate may be increased by increasing M, the pulse amplitudes required to provide the same noise immunity and minimum separation between symbols also increases. To increase the signalling rate by a factor of $\log_2 M$, and maintain comparable performance levels, the transmission power generally increases as $M^2$.

A common practice in AM broadcasting is to use high-percentage modulation, $\eta$, in order to maximize the range of the transmitting station. This occurs because boosting $\eta$ transfers more power into the sidebands and thereby devotes as much power as possible to the desired audio signal. One consequence of selecting high-percentage modulation is that there are substantial variations in the signal envelope and correspondingly broad swings in the instantaneous RF power. For example, if $\eta$ equals 90%, the difference between the minimum and the maximum RF levels is 25.6 dB. FIG. 1 indicates signal variation versus time for WKRC in Cincinnati, Ohio at 550 Khz, which suggests that such drastic changes in transmitted power are indeed commonplace.

A common approach to achieving moderate digital bandwidth efficiency without introducing distortion onto the received analog AM signal is a form of PSK in which a signal constellation of M symbols is equally spaced around a circle, as shown in FIG. 2. The resulting signal without the analog AM component has a constant envelope because each symbol state is equally distant from the origin and, therefore, has the same amplitude. The bandwidth efficiency that can be achieved is a function of the number of symbol states, M, which are available in the signal constellation. The bandwidth efficiency in bits per second per Hertz (bps/Hz) that is realized corresponds roughly to the number of data bits that can be transferred by each symbol, $I_M$. Therefore, the key to improving bandwidth efficiency is to increase M until noise and other distortion causes the received signal to violate the symbol decision boundaries indicated by the dashed lines in FIG. 2.

Stanford Research Institute (SRI) proposed a digital audio broadcasting scheme using an M-ary PSK format with eight symbol states, i.e., 8-PSK, which provides a bandwidth occupancy of $\log_2 8=3$ bps/Hz. The SRI approach encodes the audio source using the Masking-pattern Adapted Subband Coding and Multiplexing (MUSICAM) digital audio compression algorithm at a data rate of 96 kbps, resulting in 15 kHz of stereo audio bandwidth. Including a 2.4 kbps subcarrier as well as error detection and correction coding increases the overall data rate to 115 kbps. This produces a composite signal bandwidth of 38.3 kHz for 8-PSK, which exceeds the 20.4 kHz, 0 dBc AM emissions mask currently stipulated by FCC Rule G73.44. This restriction compelled SRI to reduce the digital signal level by 25 dB so that it complies with the 40 kHz wide, −25 dBc transmission mask.

A fixed modulation format, such as M-ary PSK on AM, suffers from the fact that it must be designed for adequate noise immunity in the troughs of the RF carrier envelope. Therefore, the signal power during the other portions of the RF waveform far exceeds the necessary threshold level. The excess signal power can easily surpass 25 dB, which suggests that there are substantial opportunities to increase the channel efficiency. FIG. 3 depicts a constellation diagram for the fixed modulation format with 90% modulation. At the minimum RF signal level, there is just enough signal-to-noise ratio (SNR) to produce a bit error rate (BER) of $10^{-7}$. However, the symbol states become widely separated at the higher signal amplitudes, creating the excess just discussed.

A modulation format is needed that is generally bandwidth-efficient yet can take advantage of the greater intersymbol separation which occurs at higher power levels of the transmitted signal by adaptively tailoring the digital modulation constellation to the instantaneous amplitude of the transmission signal envelope.

SUMMARY OF THE INVENTION

The invention provides for a radio frequency broadcasting system and method for transmitting and receiving a composite analog-and-digital signal for commercial AM digital audio broadcasting (DAB). In general, analog audio modulates the amplitude of a carrier and the digital signal adaptively modulates the phase. The channel rate of the digital signal can be dynamically tailored to the instantaneous amplitude of the signal envelope.

The broadcast signal can be constructed in a transmitter by (1) a first signalling means for providing an analog signal which signal may be an audio signal, (2) a second signalling means for providing an adaptively-modulated phase-shift-keyed digital signal, (3) a modulator for modulating the analog signal from the first signalling means on the adaptively-modulated phase-shift-keyed digital signal produced by the second signalling means, thereby producing a composite signal, and (4) a transmission means for broadcasting a transmission signal which is proportional to the composite signal produced by the modulator.

Analog or composite signal envelope parameters can be used by the second signalling means to adaptively choose a preselected digital data transfer rate. In general, the number of symbol states that are used to transmit the digital data increases with the transmitted power level during a given symbol interval. For example, in one present preferred embodiment of the invention herein, eight symbol states may be used in the trough, or minimum transmitted power level, while one hundred and twenty-eight symbol states may be used in the peak, or maximum transmitted power level. Intermediate numbers of symbol states may be selected between peak and trough transmitted power levels. The second signalling means phase-modulates the AM carrier so that current analog audio programming can be broadcast to and received by existing commercial AM receivers, which would be unaffected by the digital signals.

The symbol states are arranged generally in a plurality of concentric arcs on a phase plane. To reduce the effect of channel noise and distortion, each symbol state is spaced generally equidistant from adjacent symbol states. The number of symbol states used at a particular power level are selected such that the bit error rate (BER) associated with the data transmission is generally less than $10^{-7}$, and that the bandwidth of the transmitted signal fits within the 20.4 kHz, 0 dBc AM mask required by the FCC for AM frequency transmissions under FCC Rule G73.44.

Each receiver includes reception means for detecting the broadcast transmission signal and producing a received signal proportional to the transmission signal, which signals can have the analog signal and the adaptively-modulated phase-shift-keyed digital signal encoded therein. Connected to the reception means can be a signal recovery means for recovering the adaptively-modulated phase-shift-keyed digital signal from the received signal. Playback means to produce a demodulated analog signal, such as an audio signal, from the adaptively-modulated phase-shift-keyed signal may also be provided.

Alternatively, the signal recovery means may include analog signal recovery means for also recovering the analog signal from the received signal. Where means are provided to recover both analog and AMPSK digital signals, playback means to produce a demodulated analog signal, such as an audio signal, derived from both the analog and AMPSK digital signals may be provided.

Transmitters which broadcast radio-frequency signals according to the invention herein can use a method that comprises the steps of (1) providing an analog signal, which can be an audio programming signal; (2) providing at least one adaptively-modulated phase-shift-keyed digital signal; (3) modulating the analog signal on the adaptively-modulated phase-shift-keyed digital signal thereby producing a composite signal; and, then, (4) broadcasting a transmission signal proportional to that composite signal. The method encompasses tailoring the modulation of the adaptively-modulated phase-shift-keyed signal to either the analog or the composite signal by using a plurality of symbol states to represent the digital data, which states are arranged according to a predetermined rule.

BRIEF DESCRIPTION OF THE DRAWINGS

FIG. 8 is a diagram of a radio-frequency receiver according to the invention herein.

FIG. 9 is a diagram of a radio-frequency receiver according to the invention herein.

DETAILED DESCRIPTION OF THE PREFERRED EMBODIMENTS

Figure 1:
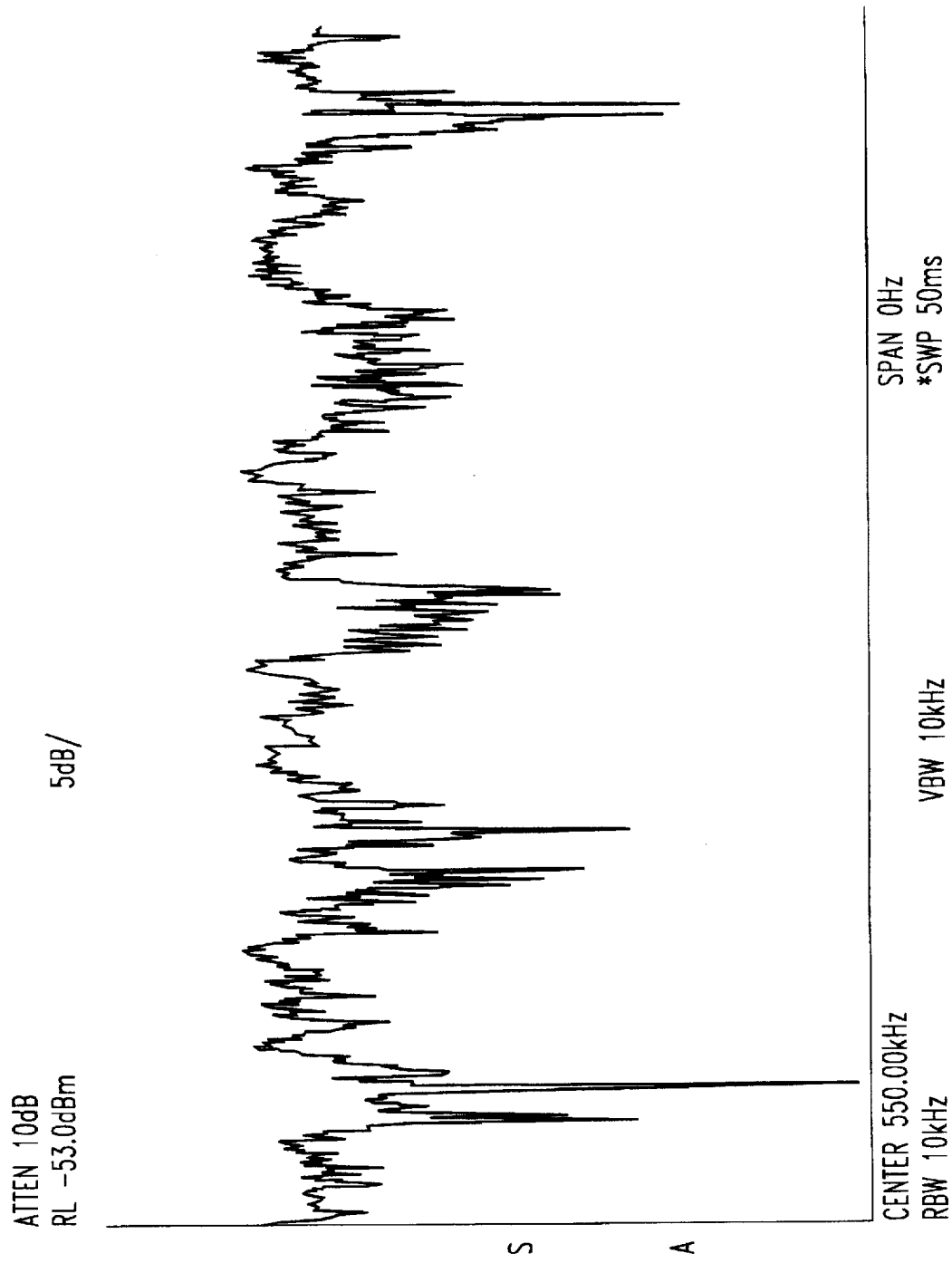
FIG. 1 is a temporal plot of transmitted signal power for a typical radio station broadcasting in the commercial AM frequency range.
Figure 2:
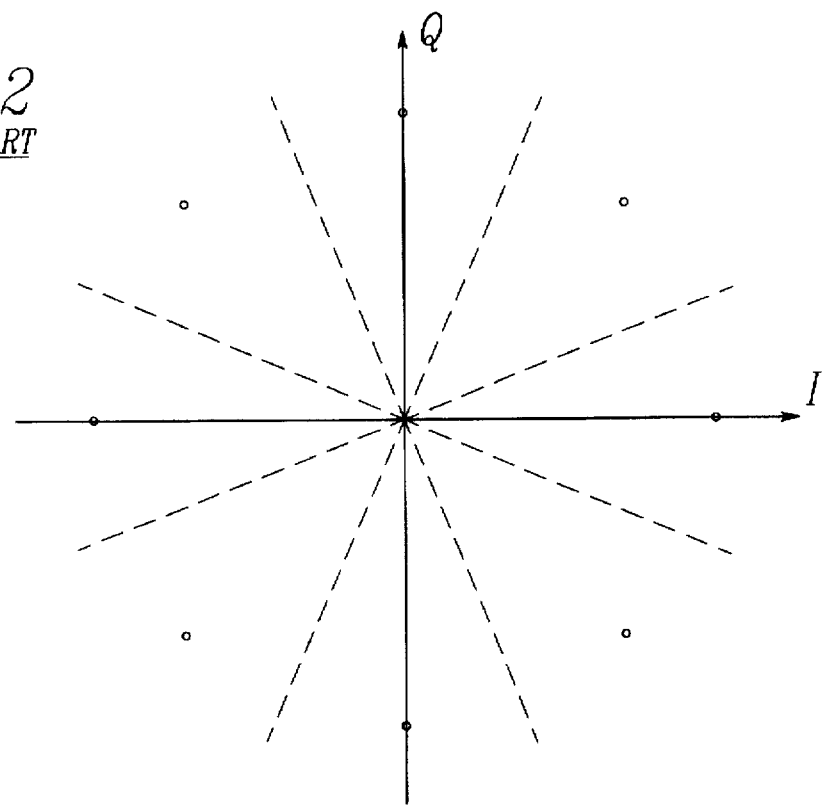
FIG. 2 is an illustration of a phase plane constellation for one type of existing fixed-format PSK signalling.
Figure 3:
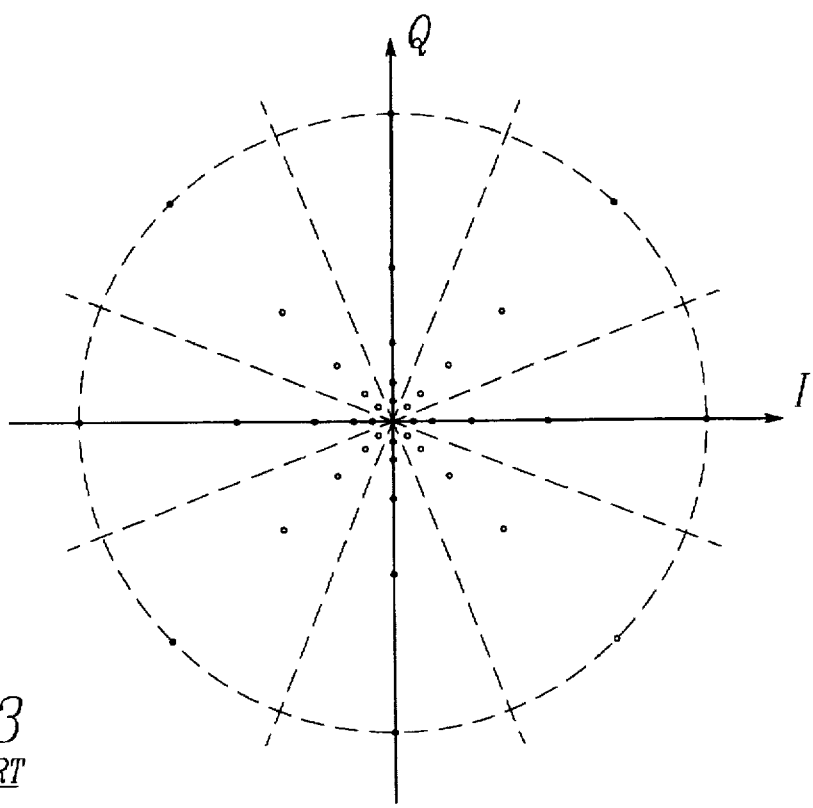
FIG. 3 is an illustration of a phase plane constellation for one example of fixed-format PSK signalling with an AM signal modulated thereon.

The invention provides a modulation method in which a digital representation of an audio signal is encoded together with its analog amplitude-modulated (AM) counterpart and transmitted simultaneously in the same frequency channel. In the present preferred embodiments, the signal constellation is tailored to match the available RF signal amplitude. In the modulation method disclosed herein, the data rate varies dynamically in conjunction with the amplitude of the AM modulation envelope.

Fixed-format M-ary PSK has been used extensively in telecommunication systems design in order to improve the bandwidth efficiency of transmitting digital information. However, because fixed format M-ary PSK is constrained to operate within the troughs of the RF transmission signal envelope, it does not take advantage of the numerous periods during which the RF signal amplitude, and RF transmitted power, far exceed that which is necessary to transmit the PSK data in the selected format.

The invention herein presents a waveform that yields an in-band on-channel (IBOC) solution to providing digital audio broadcasting in the AM frequency band (AM DAB). There are no AM DAB stations at this time, but there is considerable interest in this technology because it provides a means to compete against high quality portable audio sources such as cassette tapes and CD players. An intent of AM DAB is to provide enhanced fidelity through digital signalling without affecting reception for existing analog AM receivers.

The primary requirement in AM DAB is to insert at least 100 kbps of data within the 20.4 kHz, 0 dBc FCC mask presently allocated for AM stations under FCC Rule G73.44. This corresponds to a bandwidth efficiency of at least 5 bps/Hz because any emission outside of the 20.4 kHz, 0 dBc mask must be attenuated at least 25 dB below the unmodulated AM carrier level. By adaptively modulating an M-ary PSK signal in conjunction with an analog audio signal, thereby creating an AM transmission signal envelope according to the invention herein, increased digital data throughput may be effected within the fixed AM frequency transmission bandwidth currently allocated by the FCC.

The process of adaptively tailoring the constellation to match the available signal amplitude is termed adaptive M-ary PSK (AMPSK). The advantages of AMPSK include (1) existing analog AM broadcasting channels can be upgraded to digital without requiring a new FCC frequency allocation; (2) AM broadcast stations can be upgraded to AMPSK with limited capital expenditure; (3) AMPSK yields a coverage area that is essentially equivalent to existing analog AM stations; and (4) existing AM receivers can recover the analog portion of the AMPSK signal without any modification. Compared to standard PSK modulation formats, AMPSK provides superior bandwidth efficiency, simplifying the task of complying with the FCC spectrum mask for AM broadcasts. Also, the data rate can be improved significantly because AMPSK increases the average number of bits per symbol.

Figure 4:
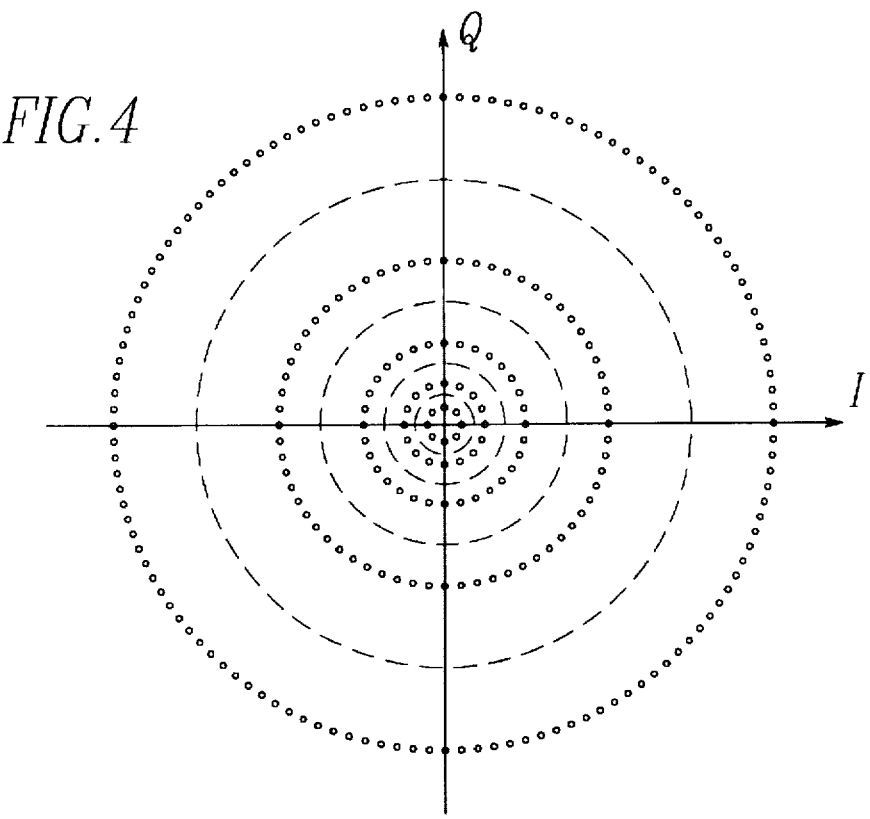
FIG. 4 is an illustration of a broadband phase plane constellation for adaptive-modulation-format PSK signalling according to the invention herein.

One method to efficiently take advantage of the power variation in an AM modulated M-ary PSK signal is to increase the number of valid symbol states at the higher RF amplitudes. One presently preferred broadband signal constellation is shown in FIG. 4. This format can support 8-PSK in the RF troughs as before, but this may be increased to 128-PSK at the peaks of the RF envelope. The data fidelity measured in terms of BER would be nearly constant at any signal amplitude because the separation between the symbol states is generally the same for each circular ring in the constellation. Although other methods offer the opportunity to modify an M-ary PSK constellation to adjust the aggregate data rate, there is no connection between the data rate and the amplitude of the AM-modulated envelope, as there is in AMPSK.

AMPSK is feasible when the digital signalling rate exceeds the nominal rate of change of the analog signal. This criteria exists because the AM signal envelope needs to remain reasonably constant over the symbol period in order to effectively utilize the higher-order PSK symbols. This constraint is satisfied for AM DAB because the signalling rate at 115 kbps, and 3–7 bits per symbol, is 23 ksps, which corresponds to a period of 43.5 µs. The program material for analog AM broadcasts is bandlimited to 10 kHz in order to meet the FCC emissions mask, but the most significant spectral components for speech and music are generally in the vicinity of 1 kHz. This implies that the amplitude of the RF envelope can be relatively constant over a duration of 100 µs, which equals 10% of the period of a 1 kHz tone. This period exceeds the 43.5 µs symbol period by more than a factor of 2, implying that AMPSK can support AM DAB.

Figure 5:
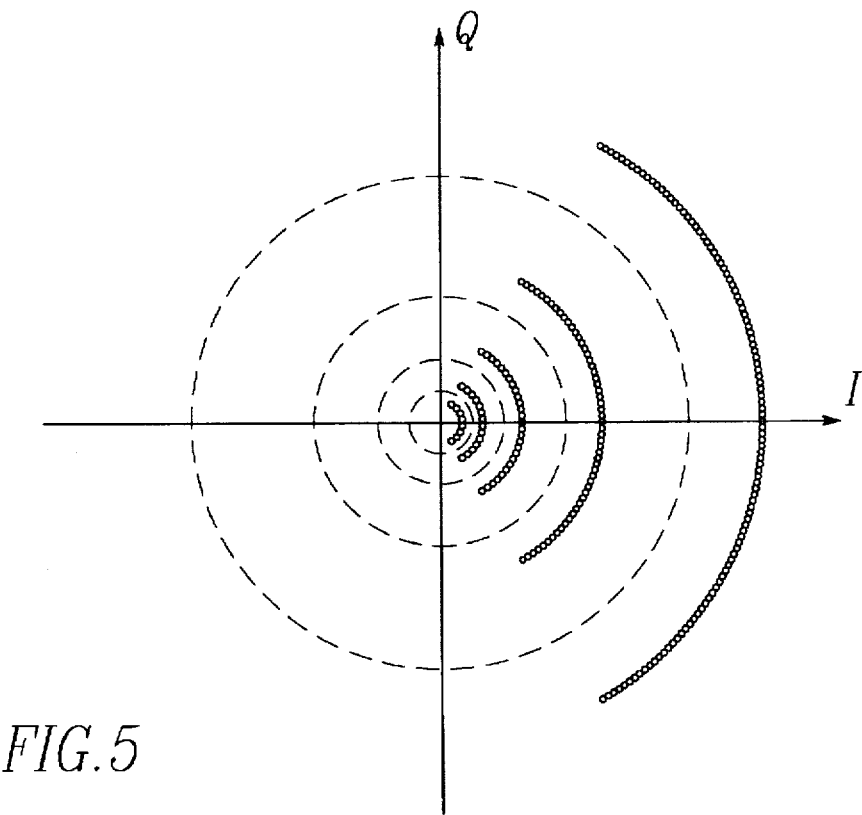
FIG. 5 is an illustration of a narrowband phase plane constellation for adaptive-modulation-format PSK signalling according to the invention herein.

Filtering a phase-modulated symbol produces a certain degree of AM energy which an analog AM receiver could detect as interference. This distortion factor could be attenuated to imperceptible levels by reducing the phase deviation of the PSK symbols. Note that this may further restrict the AMPSK spectrum, making it even easier to fit within the 20.4 kHz, 0 dBc FCC AM mask. The signal constellation could be made narrowband, as shown in FIG. 5, and span a limited sector of phase shifts, rather than a full circle of $2\pi$ radians, as shown in FIG. 4. In addition, the number of bits per symbol may need to be reduced somewhat in order to retain a BER of $10^{-7}$.

The resources offered by AMPSK can be applied to either increase the DAB data rate or reduce the bandwidth. If the symbol rate is kept the same as the standard 8-PSK format, AMPSK can boost throughput by 67% because the number of bits per symbol can vary between 3 and 7. Therefore, SRI's proposal for 8-PSK at a data rate of 115 kbps would be raised to 192 kbps by taking advantage of AMPSK. Note that the overall BER can be comparable for both approaches because the minimum spacing between symbol states in the constellation is identical. The additional 77 kbps provided by AMPSK could either be applied to improving the fidelity of the MUSICAM-encoded source material or raising the digital subcarrier rate from 2.4 kbps to 79.4 kbps.

Alternatively, reducing the symbol rate can enable AMPSK to provide the same data throughput as standard 8-PSK, but with about 40% less bandwidth. SRI's proposed 38.3 kHz spectrum for 8-PSK could be reduced to 23.0 kHz for AMPSK. This narrower bandwidth can prove to be quite attractive for AM DAB because it nearly fits within the 20.4 kHz, 0 dBc mask presently allocated for AM stations. As a result, the AMPSK signal might not need to use the −25 dBc skirts of the AM mask to carry data and could effectively avoid the complications associated with adjacent channel interference.

Figure 6:
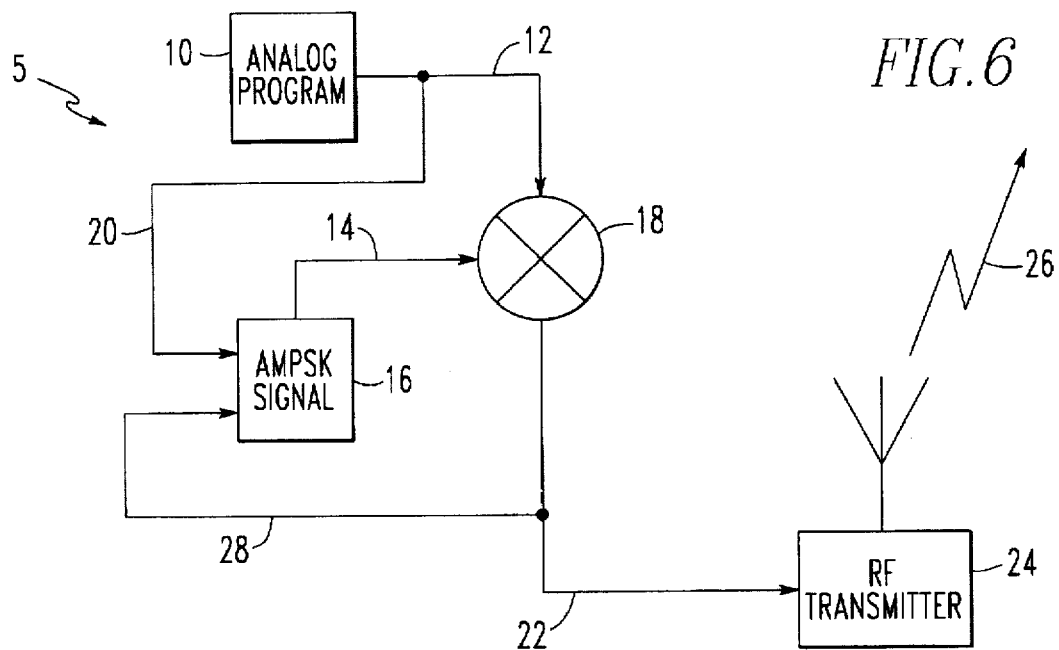
FIG. 6 is a diagram of a radio-frequency transmitter according to the invention herein.

One present preferred embodiment of an AMPSK AM DAB transmitter 5 is shown in FIG. 6. Analog signalling means 10 can produce baseband analog signal 12, in the manner of current AM transmission systems. AMPSK digital signal 14 may replace an unmodulated RF carrier tone as the carrier signal and can be generated by AMPSK signalling means 16. Analog signal 12 may be modulated onto AMPSK signal 14 by analog AM modulator 18, thereby producing composite signal 22. Signal 22 is then amplified, conditioned, and broadcast by RF transmission means 24 as AM DAB transmission signal 26 for reception by both AM DAB and analog AM receivers. In the present preferred embodiment, the DAB data rate is tailored to a parameter of the transmission signal envelope, such as amplitude or power, as the parameter is represented in baseband analog signal 12. Signal 20, which is proportional to the transmission signal envelope, may be fed to AMPSK signalling means 16 to provide a reference signal by which the DAB data rate may be tailored. Alternatively, the envelope could be detected from the composite AM DAB waveform via signal 28. An advantage of these embodiments is that existing AM broadcast transmitters are generally compatible with AM DAB transmitter 5.

Figure 7:
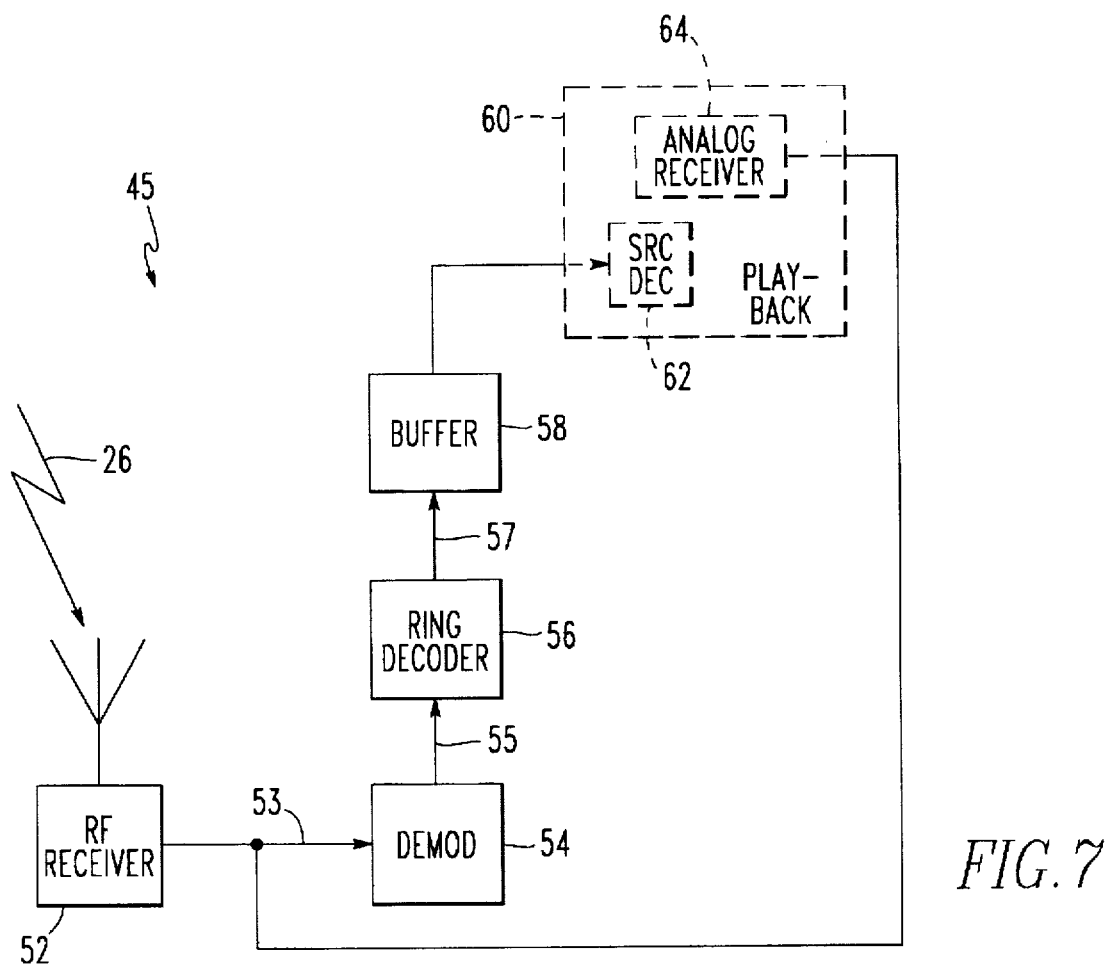
FIG. 7 is a diagram of a radio-frequency receiver according to the invention herein.

In a first preferred embodiment of an AM DAB receiver, as shown in FIG. 7, AM DAB transmission signal 26 is received by RF reception means 52 which can be part of receiver 45. AMPSK data 55 can be recovered from received signal 53 at receiver 45 with demodulator 54. In this present embodiment, it is preferred that demodulator 54 be a standard 128-PSK demodulator because all symbol states and detection thresholds line up with the 128-PSK constellation.

Interpreting every symbol as 128-PSK can introduce superfluous bits in demodulated data 55, but this extra information can be purged by processing with constellation ring decoder 56 that translates each 128-PSK symbol to the correct ring in the constellation. The ring identifier could operate by detecting the envelope of received signal 53. DAB digital data 57 may be buffered by DAB data stream buffer 58 so that it may enter playback means 60 at a predetermined rate. This may be necessary where playback means 60 includes source decoder 62. Where analog signal recovery means is not provided, playback means 60 may produce a demodulated signal from the AMPSK signal alone. However, analog components of received signal 53 may be recovered for playback by a separate analog signal recovery means 64 which may also be part of playback means 60. Playback means 60 then can produce a demodulated signal, e.g., audio signal, from the analog and AMPSK signals, which audio signal can include, for example, high-quality stereo sound reproduction.

In a second present preferred embodiment of an AM DAB receiver, as shown in FIG. 8, AM DAB transmission signal 26 is received by RF reception means 152 which can be part of receiver 145. As in FIG. 7, AMPSK data 155 can be recovered from received signal 153 at receiver 145 with demodulator 154. In FIG. 8, however, it is preferred to provide ring decoder 156 with correction signal 172, which correction signal 172 is derived from received signal 153 by ring decoder 171. Ring decoder 171 provides constellation ring identification. As in FIG. 7, it is preferred in this present embodiment of FIG. 8 that demodulator 154 also be a standard 128-PSK demodulator, because all symbol states and detection thresholds line up with the 128-PSK constellation. Because interpreting every symbol as a 128-PSK symbol can introduce superfluous bits in demodulated data 155, correction signal 172 provided by ring decoder 171 drives constellation ring decoder 156 to produce the correct output format from the 128-PSK decoder signal 155. DAB digital data 157 may be buffered by DAB data stream buffer 158 so that it may enter playback means 160 at a predetermined rate, for example, when source decoder 162 is included, similar to that shown in FIG. 7. Where analog signal recovery means is not provided, playback means 160 may produce the demodulated analog signal from the AMPSK signal alone. However, analog components of received signal 153 may be recovered for playback by a separate analog signal recovery means 164 which may also be part of playback means 160. Playback means 160 then can produce a demodulated signal, e.g., an audio signal, from the analog and AMPSK signals, which audio signal can include, for example, high quality stereo sound reproduction.

In FIG. 9, a third present preferred embodiment of an AM DAB receiver according to the invention herein is shown. Receiver 245 receives AM DAB transmission signal 26 using RF reception means 252. It is preferred to provide received signal 253 to ring decoder 281 and demodulator 254. Ring decoder 281 initially identifies the correct constellation ring thereby providing demodulator 254 with correction signal 282. Demodulator 254 can decode to the correct bit pattern based on received signal 253 and correction signal 282. Because of the ring identification and code correction provided by ring decoder 281 to demodulator 254, an additional constellation ring decoder, comparable to constellation ring decoder 56 in FIG. 7 and constellation ring decoder 156 in FIG. 8, may be eliminated. Demodulator 254 may then produce DAB digital data 257 for buffering by DAB data stream buffer 258 prior to the data's entry into playback means 260, for example, when source decoder 262 is is included. As in FIGS. 7 and 8, playback means 260 can produce a demodulated analog signal, e.g., an audio signal, from the AMPSK signal alone thereby producing, for example, high-quality stereo sound reproduction. Also as in FIGS. 7 and 8, analog components of received signal 253 may be recovered for playback by a separate analog signal recovery means 264, which may also be part of playback means 260. Again, playback means 260 can produce a demodulated signal from both the analog and the AMPSK signals.

In the foregoing specification, certain preferred practices and embodiments of this invention have been set out. However, it will be understood that the invention may be otherwise embodied within the scope of the following claims.

The invention claimed is:
1. A radio-frequency broadcasting system comprising:
 a. at least one transmitter having
  i. first signalling means for providing an analog signal;
  ii. second signalling means, responsive to the amplitude of said analog signal, for providing an adaptively-modulated phase-shift-keyed digital signal having a plurality of symbol states arranged in a plurality of concentric rings or circular arcs defining a constellation, with the mutual arcuate separation between said symbol states being substantially the same for all of the rings or arcs in the constellation for providing substantially constant data fidelity measured in terms of bit error rate within an AM frequency band;
  iii. a modulator, connected to said first signalling means and said second signalling means, for amplitude modulating said adaptively-modulated phase-shift-keyed digital signal with said analog signal, said modulator producing a composite signal; and
  iv. transmission means, connected to said modulator, for broadcasting a transmission signal, said transmission signal being proportional to said composite signal; and b. at least one receiver having
   i. reception means for detecting said transmission signal, said reception means producing a received signal proportional to said transmission signal, said received signal having said analog signal and said adaptively-modulated phase-shift-keyed digital signal encoded therein; and
   ii. signal recovery means, including a phase-shift-keyed demodulator connected to said reception means for recovering said adaptively-modulated phase-shift-keyed digital signal from said received signal, and a constellation ring or arc decoder for purging superfluous bits in the digital signal recovered by said demodulator.

2. The radio-frequency broadcasting system of claim 1 wherein said adaptively-modulated phase-shift-keyed digital signal has
   a first predetermined number of symbol states when the transmitted power of said transmission signal generally is at a maximum,
   a second predetermined number of symbol states when the transmitted power of said transmission signal generally is at a minimum, and
   said first predetermined number of symbol states being greater than said second predetermined number of symbol states.

3. The radio-frequency broadcasting system of claim 2 wherein said second predetermined number of symbol states is eight symbol states and said first predetermined number of symbol states is one hundred and twenty-eight symbol states.

4. The radio-frequency broadcasting system of claim 2 wherein said plurality of symbol states further comprises
   a third predetermined number of symbol states when the transmitted power of said transmission signal generally is intermediate said maximum and said minimum, and
   said second predetermined number of symbol states being less than said third predetermined number of symbol states.

5. The radio-frequency broadcasting system of claim 4 wherein said first predetermined number of symbol states is greater than said third predetermined number of symbol states.

6. The radio-frequency broadcasting system of claim 2 wherein the number of said symbol states are selected so that the bit error rate of said transmission signal is generally less than $10^{-7}$.

7. The radio-frequency broadcasting system of claim 2 wherein the number of said symbol states are selected so that the bandwidth of said transmission signal fits generally within a 20.4 kHz 0 dBc AM emissions mask.

8. The radio-frequency broadcasting system of claim 6 wherein the number of said symbol states are selected so that the bandwidth of said transmission signal fits generally within a 20.4 kHz, 0 dBc AM emissions mask.

9. The radio-frequency broadcasting system of claim 1 wherein each of said at least one receiver further comprises playback means connected to said signal recovery means for producing a digital signal from said one adaptively-modulated phase-shift-keyed signal.

10. The radio-frequency broadcasting system of claim 1 wherein said signal recovery means includes means for recovering said analog signal from said received signal.

11. A radio-frequency transmitter comprising:
    a. first signalling means for providing an analog signal;
    b. second signalling means, responsive to the amplitude of said analog signal, for providing at least one adaptively-modulated phase-shift-keyed digital signal having a plurality of symbol states arranged in a plurality of concentric rings or circular arcs defining a constellation, with the mutual arcuate separation between said symbol states being substantially the same for all of the rings or arcs in the constellation for providing substantially constant data fidelity measured in terms of bit error rate within an AM frequency range;
    c. a modulator, connected to said first signalling means and said second signalling means, for modulating said analog signal on said at least one adaptively-modulated phase-shift-keyed digital signal, said modulator producing a composite signal; and
    d. transmission means connected to said modulator, for broadcasting a transmission signal, said transmission signal being proportional to said composite signal.

12. The radio-frequency transmitter of claim 11 wherein said plurality of symbol states comprises
    a first predetermined number of symbol states when the transmitted power of said transmission signal generally is at a maximum,
    a second predetermined number of symbol states when the transmitted power of said transmission signal generally is at a minimum, and
    said first predetermined number of symbol states being greater than said second predetermined number of symbol states.

13. The radio-frequency transmitter of claim 12 wherein said second predetermined number of symbol states is eight symbol states and said first predetermined number of symbol states is one hundred and twenty-eight symbol states.

14. The radio-frequency transmitter of claim 12, wherein said plurality of symbol states further comprises
    a third predetermined number of symbol states when the transmitted power of said transmission signal generally is intermediate said maximum and said minimum, and
    said second predetermined number of symbol states being less than said third predetermined number of symbol states.

15. The radio-frequency transmitter of claim 14 wherein said first predetermined number of symbol states is greater than said third predetermined number of symbol states.

16. The radio-frequency transmitter of claim 12 wherein the number of said symbol states are selected so that the bit error rate of said transmission signal is generally less than $10^{-7}$.

17. The radio-frequency transmitter of claim 12 wherein the number of said symbol states are selected so that the bandwidth of said transmission signal fits generally within a 20.4 kHz 0 dBc AM emissions mask.

18. The radio-frequency transmitter of claim 16 wherein the number of said symbol states are selected so that the bandwidth of said transmission signal fits generally within a 20.4 kHz 0 dBc AM emissions mask.

19. A radio-frequency receiver comprising:
    a. reception means for detecting a transmission signal, said reception means producing a received signal proportional to said transmission signal, said received signal having an analog signal and at least one adaptively-modulated phase-shift-keyed digital signal encoded therein having a plurality of symbol states arranged in a plurality of concentric rings or circular arcs defining a constellation with the mutual arcuate separation between said symbol states being substantially the same for all of the rings or arcs in the constellation for providing substantially constant data fidelity measured in terms of bit error rate; and b. signal recovery means, including a phase-shift-keyed demodulator connected to said reception means for recovering said at least one adaptively-modulated phase-shift-keyed digital signal from said received signal, and constellation ring or arc decoder for purging superfluous bits in the digital signal recovered by said demodulator.

20. The radio-frequency receiver of claim 19 further comprising second signal recovery means for recovering said analog signal from said received signal.

21. A radio-frequency broadcasting method, comprising the steps of:

a. providing an analog signal;

b. providing an adaptively-modulated phase-shift-keyed digital signal having a plurality of symbol states arranged in a plurality of concentric rings or circular arcs defining a constellation, with the mutual arcuate separation between said symbol states being substantially the same for all of the rings or arcs in the constellation for providing substantially constant data fidelity measured in terms of bit error rate;

c. amplitude modulating said analog signal on said adaptively-modulated phase-shift-keyed digital signal, thereby producing AMPSK composite signal; and d. broadcasting a transmission signal proportional to said composite signal.

22. The radio-frequency broadcasting method of claim 21 wherein said step of producing said adaptively-modulated phase-shift-keyed digital signal further comprises the step of varying the modulation of said adaptively-modulated phase-shift-keyed digital signal in response to the amplitude of said analog signal.

23. The radio-frequency broadcasting method of claim 21 wherein said adaptively-modulated phase-shift-keyed digital signal has a first predetermined number of symbol states when the transmitted power of said transmission signal generally is at a maximum, a second predetermined number of symbol states when the transmitted power of said transmission signal generally is at a minimum, and said first predetermined number of symbol states being greater than said second predetermined number of symbol states.

24. The radio-frequency broadcasting method of claim 23 wherein said second predetermined number of symbol states is eight symbol states and said first predetermined number of symbol states is one hundred and twenty-eight symbol states.

25. The radio-frequency broadcasting method of claim 23 wherein said plurality of symbol states further comprises a third predetermined number of symbol states when the transmitted power of said transmission signal generally is intermediate said maximum and said minimum, and said second predetermined number of symbol states being less than said third predetermined number of symbol states.

26. The radio-frequency broadcasting method of claim 25 wherein said first predetermined number of symbol states is greater than said third predetermined number of symbol states.

27. The radio-frequency broadcasting method of claim 23 wherein the number of said symbol states are selected so that the bit error rate of said transmission signal is generally less than $10^{-7}$.

28. The radio-frequency broadcasting method of claim 23 wherein the number of said symbol states are selected so that the bandwidth of said transmission signal fits generally within a 20.4 kHz, 0 dBc AM emissions mask.

29. The radio-frequency broadcasting method of claim 24 further comprising the steps of:

e. detecting said transmission signal;

f. producing a received signal proportional to said transmission signal, said received signal having said AMPSK composite signal encoded therein; and g. recovering said adaptively-modulated phase-shift-keyed digital signal and said analog signal from said AMPSK composite signal.

30. The radio-frequency broadcasting method of claim 23 wherein the number of said symbol states are selected so that the bandwidth of said transmission signal fits generally within a 20.4 kHz, 0 dBc emissions mask.

* * * * *